UNITED STATES PATENT OFFICE.

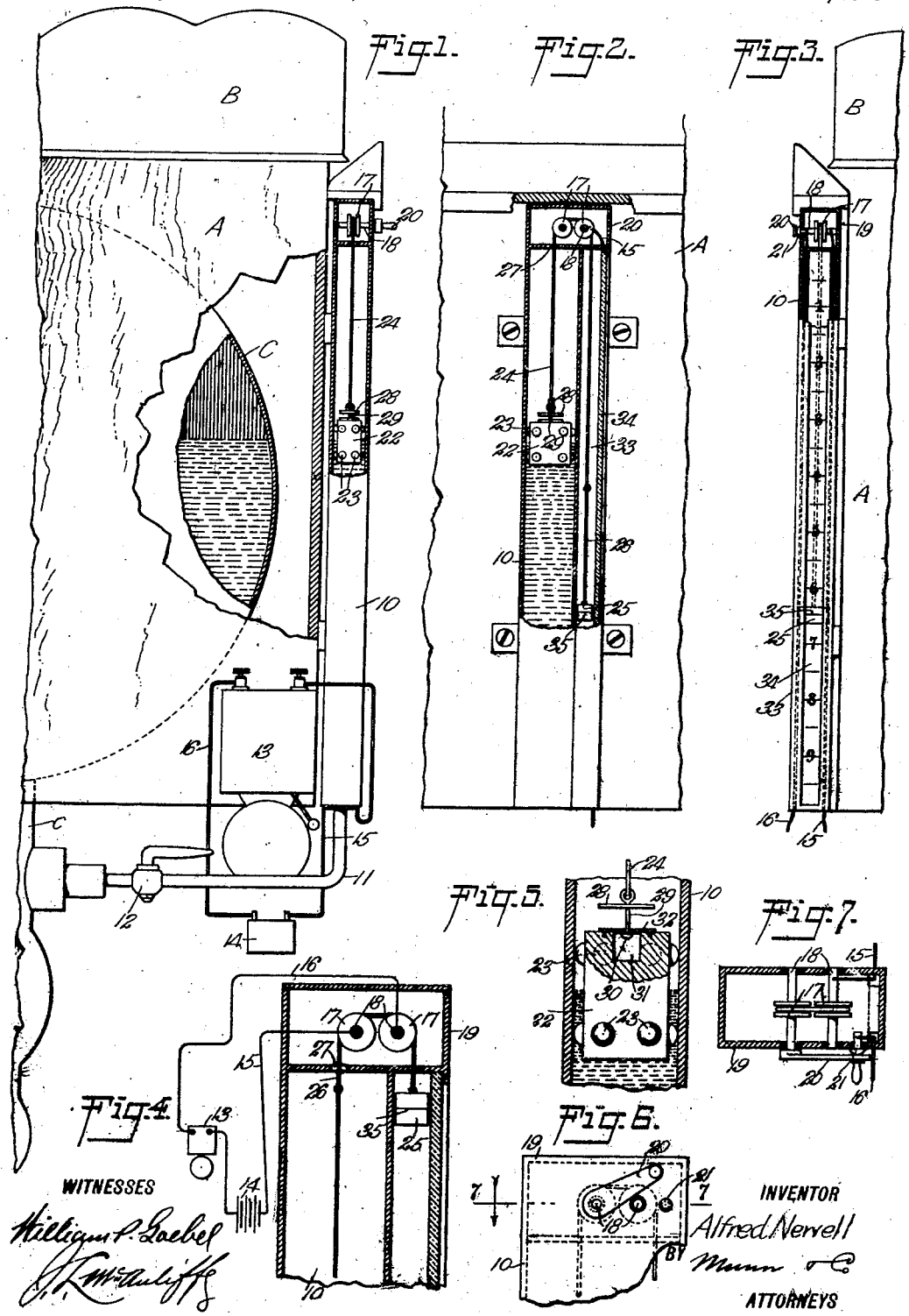

ALFRED NEWELL, OF OTTAWA, ONTARIO, CANADA.

LOW-LEVEL INDICATOR AND ALARM.

1,291,088.  Specification of Letters Patent.  Patented Jan. 14, 1919.

Application filed July 29, 1918. Serial No. 247,192.

*To all whom it may concern:*

Be it known that I, ALFRED NEWELL, a subject of the King of Great Britain, and a resident of Ottawa, in the Province of Ontario and Dominion of Canada, have invented a new and Improved Low-Level Indicator and Alarm, of which the following is a description.

My invention although adapted for more general use, is especially intended for use in connection with the gasolene tank of an automobile for giving an alarm upon the gasolene reaching a predetermined low level. The invention relates to an indicator and alarm employing a gage tube or cylinder and a float therein; together with means to automatically close an alarm circuit upon the liquid in the gage reaching a predetermined low level.

The general object of the invention is to provide an indicator and alarm of the type indicated that will clearly indicate the level at all times and will unfailingly function to give an alarm when the liquid level for which it is adjusted is reached.

More specifically, the invention has for its purpose to cause the movement of the float to close the circuit through the medium of the flexible means connecting the float with a counter-weight; to utilize the counter-weight as an indicating means in coaction with the gage to the end that the indicated level may be clearly visible from the driver's seat of the automobile: and to provide for the ready application of the attachment to an automobile and its gasolene tank, as well as to provide a simple and durable construction and promote convenience in the assemblage and adjustment of the parts.

Reference is to be had to the accompanying drawings forming a part of this specification, it being understood that the drawings are merely illustrative of one example of the invention.

Figure 1 is an elevation with parts in section of an indicator and alarm embodying my invention, showing the same applied to an automobile and gasolene tank shown in part;

Fig. 2 is a partly sectional elevation taken at right angles to Fig. 1;

Fig. 3 is a partly sectional elevation taken at the opposite side of the gage from Fig. 1;

Fig. 4 is an enlarged fragmentary view, in vertical section of the upper portion of the gage, an alarm circuit being indicated diagrammatically;

Fig. 5 is a vertical section of a portion of the gage tube or cylinder and a partly-sectional side elevation of a float showing the manner of connecting the float with the flexible element suspending the same through the medium of means including a valve for closing the tube at the top;

Fig. 6 is a side elevation of the upper portion of the gage tube or cylinder and a manually operable electric switch;

Fig. 7 is a horizontal section on the line 7—7, Fig. 6.

The illustrated example of my invention is shown applied to an automobile A represented in part, in a manner to be sustained in front of and below the driver's seat B. The numeral 10 indicates a vertical gage tube or cylinder connected as by a pipe 11 with the fitting $c$ appurtenant to the gasolene tank C so that the same level will be maintained in said gage tube and tank. A cut-off valve 12 is provided in the connection 11. A suitable signal here shown as an audible signal in the form of a bell or vibrator 13 is in circuit with a battery 14, the wires 15 and 16 from which run respectively to sheaves 17 disposed in tandem. The electric connections with the sheaves is established in the illustrated example as follows: The sheaves 17 are mounted on parallel shafts 18 turning in a box 19 integral with or secured to the top of the cylinder 10. One wire 15 leads to one shaft 18 and the other wire 16 makes connection with the other shaft through a switch 20 consisting of a manually operable crank arm mounted on said shaft and swingable into or out of contact with a terminal 21 to which said wire 16 is secured. The shafts 18 are insulated from each other and a closing of the switch 20 still leaves the circuit open between the sheaves and the circuit between the sheaves is automatically closed when the liquid in the tube 10 reaches a predetermined low level, as next described.

A float 22 is arranged in the tube 10 and advantageously has protuberances 23 at its several sides to give guiding contact with the walls of the tube with a view to minimize the possibility of the float binding in the tube. The float is suspended by a silk cord or equivalent flexible element 24 which runs over the tandem sheaves 17 and carries a counter-weight 25. Direct connection is not made between the cord 24 and the counter-balance weight but through the medium of a chain, metal strap, or equivalent metal connection 26 which closes the circuit through the pulleys 17 when the float falls to the predetermined low level of the liquid in the tube 10, the circuit-closing position of the metal element 26 being indicated in Fig. 4 which represents the counterweight raised to approximately the position it will occupy when the float has fallen to an extent to dispose the element 26 over the sheaves 17.

The cord 24 passes from the tube 10 to the box 19 through a hole 27 in the top of said tube and in order to close said hole when the tube 10 is filled and thereby prevent the escape of the gasolene through said hole, I provide a valve device associated with the float to effectively close the hole 27 when the float reaches the top of tube 10 with the filling of the gasolene tank. The valve in the preferred construction is in the form of a disk 28 interposed between the float 22 and the cord 24, said disk being carried in the illustrated example by a valve stem 29 having on its lower end a head 30 which is accommodated in a recess or bore 31 in the top of the float 22. The stem 29 passes through a cap plate 32 over the recess 31. The described arrangement gives freedom of play to the float relatively to the valve 28. Thus, when the float rises to the top of the tube with the filling of the tank C the pull of the counter-balance weight 25 maintains the valve 28 over the opening 27, thereby closing the latter. In addition to the pull of the weight 25 on the valve the latter is subject to the pressure of the float 22 against the under side of the valve by reason of the play permitted the float relatively to the valve stem. Thus, with the tank C and tube 10 full of gasolene, escape of the latter is prevented. At the same time the connection of the float with the valve stem 29 and its head 30 permits the float to have slight movement due to the instability of the liquid in the tube 10 due to the jar of the automobile, so that jarring of the float 22 does not disturb the seated valve 28.

In practice the circuit may be optionally broken by throwing the switch 20. With the switch arm in the closed position the circuit will remain subject to being closed by the element 26.

The counter-weight 25 moves in a vertical auxiliary pocket 33 formed in a side of the tube 10 and having a glass covering 34 through which the float is visible. Said float has a gage mark 35 thereon which is to be read in connection with a vertical scale on the glass face 34 of the pocket 33. Thus, the weight is utilized as an indicating means which is readily visible at all times from the driver's seat B so that the amount of gasolene remaining in the tank will be readily apparent.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A device of the class described including a gage tube adapted to be connected with a liquid container, a float in said tube, a counter-balance weight for the float, a flexible element suspending the float and connected with said weight to suspend the latter, said tube having a hole in the top thereof through which said element passes, and a valve movable with said element and float and adjacent to the latter to close said hole upon the float rising to the top of the tube with a rise of liquid in the latter.

2. A device of the class described including a tube adapted to be connected with a liquid container, the top of said tube having a hole therein, a float in said tube, a counter-balance weight for the float, flexible means suspending said weight at the exterior of the tube and extending through said hole to the interior of the tube, a valve in the tube and carried by said flexible means, said valve being adapted to close said hole in the tube, and a float connected with said valve and movable relatively thereto, to permit the float to press against the under side of the valve when the liquid in the tube carries the float to the top of the tube.

3. In a device of the class described, sheaves insulated from each other, an electric circuit connected with the axles of the sheaves, flexible means moving over said sheaves, and means to cause said flexible means to have movement relative to the sheaves, said flexible means including a metal portion and a non-conducting portion, the former being adapted to close the circuit between the sheaves.

ALFRED NEWELL.